US008691472B2

(12) United States Patent
Zimmermann

(10) Patent No.: US 8,691,472 B2
(45) Date of Patent: Apr. 8, 2014

(54) CELLULAR RESERVOIR AND METHODS RELATED THERETO

(75) Inventor: Joerg Zimmermann, Vancouver (CA)

(73) Assignee: Societe BIC, Clichy (FR)

( * ) Notice: Subject to any disclaimer, the term of this patent is extended or adjusted under 35 U.S.C. 154(b) by 52 days.

(21) Appl. No.: 13/529,333

(22) Filed: Jun. 21, 2012

(65) Prior Publication Data

US 2012/0255877 A1 Oct. 11, 2012

Related U.S. Application Data

(63) Continuation of application No. 11/621,501, filed on Jan. 9, 2007, now Pat. No. 8,227,144.

(60) Provisional application No. 60/757,782, filed on Jan. 9, 2006.

(51) Int. Cl.
*H01M 8/22* (2006.01)
*H01M 8/04* (2006.01)

(52) U.S. Cl.
CPC *H01M 8/22* (2013.01); *H01M 8/04* (2013.01); *F17C 2270/01* (2013.01)
USPC .......................... 429/515; 220/586; 220/507

(58) Field of Classification Search
CPC ..... H01M 8/22; H01M 8/04; H01M 8/04007; H01M 8/04067; H01M 8/00; F17C 2270/01; F17C 2270/0165; F17C 2270/0184
USPC ........ 220/500, 501, 507, 516, 517, 554, 23.2, 220/23.8, 23.83, 23.88, 586, 582; 206/0.6, 206/0.7; 429/515; 98/108
See application file for complete search history.

(56) References Cited

U.S. PATENT DOCUMENTS

| 4,110,425 | A |   | 8/1978  | Buhl et al.             |
|-----------|---|---|---------|-------------------------|
| 4,360,569 | A |   | 11/1982 | Steyert et al.          |
| 4,667,815 | A | * | 5/1987  | Halene ............ 206/0.7 |
| 6,267,229 | B1 |  | 7/2001  | Heung                   |
| 6,520,219 | B2 |  | 2/2003  | Sapovalov et al.        |
| 6,796,453 | B2 |  | 9/2004  | Sanders                 |
| 7,431,756 | B2 |  | 10/2008 | Myasnikov et al.        |
| 7,691,216 | B2 | * | 4/2010  | Arashima et al. ..... 148/538 |

(Continued)

OTHER PUBLICATIONS

U.S. Appl. No. 11/621,501, Response filed Aug. 15, 2011 to Non Final Office Action mailed May 27, 2011.
U.S. Appl. No. 11/621,501, Final Office Action Mailed Jan. 20, 2012, 14 pgs.
U.S. Appl. No. 11/621,501, Non Final Office Action mailed May 27, 2011, 13 pgs.

(Continued)

*Primary Examiner* — Robert J Hicks
*Assistant Examiner* — Kareen Rush
(74) *Attorney, Agent, or Firm* — Schwegman Lundberg & Woessner, P.A.

(57) ABSTRACT

Embodiments of the invention relate to a reservoir assembly for use in a device, such as a fuel cell system, hydride storage system, hydrogen compressor system, heat pump system or air conditioner system. The assembly includes a first cellular component interconnected with at least a second cellular component in which the interconnected cellular components are arranged together to substantially fill an available device space, one or more end caps coupled to a portion of the first or the second cellular components, one or more external ports for adding or removing a fluid from the reservoir in which the external ports are positioned in one or more of the end caps or cellular components, and one or more internal ports in which each internal port fluidly connects the first interconnected cellular component to at least the second interconnected cellular component.

27 Claims, 5 Drawing Sheets

(56) References Cited

U.S. PATENT DOCUMENTS

| | | |
|---|---|---|
| 7,947,119 B2 | 5/2011 | Golz et al. |
| 8,057,957 B2 * | 11/2011 | Gilicinski et al. ............ 429/515 |
| 8,147,599 B2 * | 4/2012 | McAlister ...................... 96/154 |
| 8,227,144 B2 | 7/2012 | Zimmermann et al. |
| 2004/0005488 A1 | 1/2004 | Faris et al. |
| 2006/0051638 A1 * | 3/2006 | Gross .............................. 429/26 |
| 2006/0266219 A1 | 11/2006 | Ovshinsky et al. |
| 2007/0178335 A1 | 8/2007 | Zimmermann |

OTHER PUBLICATIONS

U.S. Appl. No. 11/621,501, Notice of Allowance mailed Apr. 5, 2012, 6 pgs.

U.S. Appl. No. 11/621,501, Response filed Mar. 20, 2012 to Final Office Action mailed Jan. 20, 2012, 8 pgs.

U.S. Appl. No. 11/621,501, Restriction Requirement mailed Oct. 5, 2010, 5 pgs.

Response Filed Mar. 4, 2011 to Restriction Requirement, U.S. Appl. No. 11/621,501, 8 pgs.

* cited by examiner ically shaped cellular reservoir, according to some embodiments of
CELLULAR RESERVOIR AND METHODS RELATED THERETO

PRIORITY OF INVENTION

This application is a continuation application of U.S. patent application Ser. No. 11/621,501, filed Jan. 9, 2007, which non-provisional application claims the benefit of priority under 35 U.S.C. §119(e) to U.S. Provisional Patent Application Ser. No. 60/757,782, filed Jan. 9, 2006, which applications are herein incorporated by reference in their entirety.

TECHNICAL FIELD

Embodiments of the present invention relate to reservoirs. More specifically, embodiments of the present invention may relate to fuel storage reservoirs for a micro fuel cell. Further, embodiments of the present invention may relate to reservoirs containing hydrides.

BACKGROUND

Typically, fuels and materials such as hydrides are stored in round or cylindrically shaped reservoirs, such that the reservoir wall can effectively withstand the internal pressure of the fuel or other material. Spatially, these conventional reservoirs are very inefficient as unutilized space is present regardless of the arrangement or configuration.

Micro fuel cell power supplies intended for use in portable devices must conform to the space allotted within the portable device. The more fuel that can be stored in such a space, the higher the energy density of the overall device. Hydrides are often used to store a fuel, such as hydrogen. Efficient storage of hydrogen is an important aspect for many industrial and commercial applications, including fuel cell applications. Currently, hydrogen in compressed gas cylinders is commonly used in various industries. Metal hydrides absorb hydrogen at low pressure and can be refilled using high purity hydrogen. A metal hydride reservoir can store significantly more hydrogen than traditional compressed hydrogen tanks.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

SUMMARY

Figure 1:
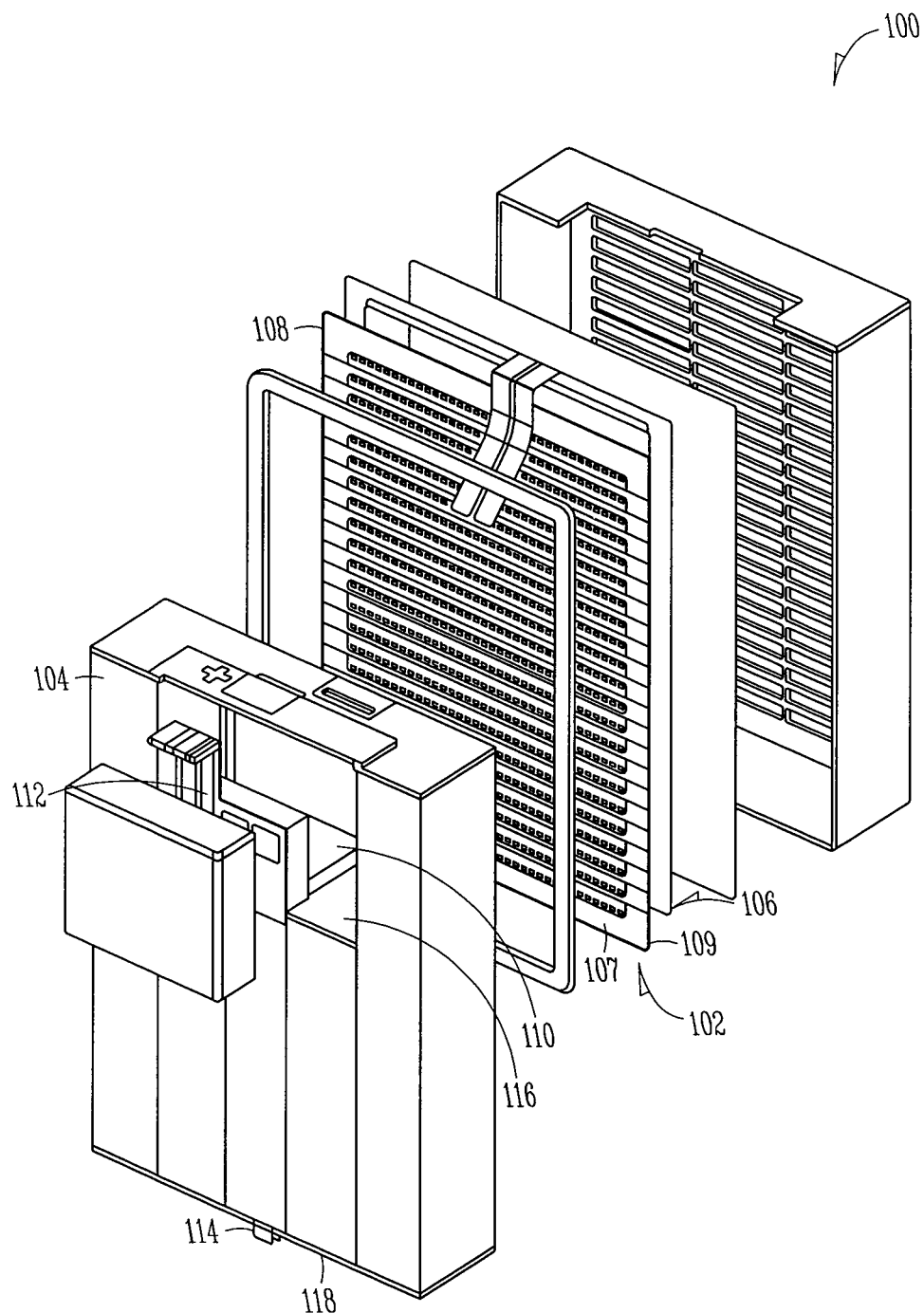
FIG. 1 illustrates an exploded view of a fuel cell system, including a cellular reservoir, according to some embodiments of the invention.

Embodiments of the invention relate to a reservoir assembly for use in a device, such as a fuel cell system, hydride storage system, hydrogen compressor system, heat pump system, air conditioner system, or combinations thereof. The assembly comprises a first cellular component interconnected with at least a second cellular component in which the interconnected cellular components are arranged together to substantially fill an available device space, one or more end caps coupled to a portion of the first or the second cellular components, one or more external ports for adding or removing a fluid from the reservoir in which the external ports are positioned in one or more of the end caps or cellular components, and one or more internal ports in which each internal port fluidly connects the first interconnected cellular component to at least the second interconnected cellular component.

In addition, some embodiments of the invention relate to a fuel cell system, comprising at least one fuel cell, a reservoir including: a first cellular component interconnected with at least a second cellular component in which the interconnected cellular components are arranged to substantially fill an available space. The fuel cell system may also include a fuel or a fuel storage material disposed within the first or the second cellular components, and one or more end caps coupled to a portion of the first or the second cellular components, and one or more external ports providing for an addition or removal of the fuel from the reservoir.

A method of fabricating a reservoir for use in a device is also provided. The method comprises forming at least a first cellular component and a second cellular component, interconnecting the first cellular component and the second cellular component, forming one or more end caps and coupling the one or more end caps to at least a portion of the interconnected cellular components.

These and other aspects, advantages, and features of the present assemblies and methods will become apparent from a consideration of the following description and associated drawings.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

In this document, the terms "a" or "an" are used to include one or more than one and the term "or" is used to refer to a nonexclusive or unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Embodiments of the present invention describe a cellular reservoir that may be used in a portable galvanic or electrochemical cell, such as a fuel cell system, as a fuel reservoir. Other embodiments describe a reservoir that may be used as a hydride storage reservoir for use in a device, such as in heat pumps, hydrogen compressors or air conditioners, for example. Some examples of portable electronics for use with the fuel cell include, but are not limited to, cellular phones, satellite phones, laptop computers, computer accessories, displays, personal audio or video players, medical devices, televisions, transmitters, receivers, lighting devices including outdoor lighting or flashlights, electronic toys, or any device conventionally used with batteries. According to some embodiments, the cellular reservoir maximizes fuel storage space by conforming to an available space while still maintaining the physical integrity of the reservoir by way of the cellular internal structure.

Referring now to the drawings, particularly to FIG. 1, there is illustrated a fuel cell system 100 of the type, for example, discussed in Mclean et al., U.S. patent application Ser. No. 11/621,533, entitled "PORTABLE FUEL CELL SYSTEMS AND METHODS THEREFOR," filed on 9 Jan. 2007, and published as U.S. Pat. App. Publication 2007/0184330 on 9 Aug. 2007, the disclosure of which is incorporated herein by reference in its entirety. Among other things, fuel cell system 100 includes a fuel cell layer 102, a cellular reservoir 104, and an optional current collecting circuit 106.

Fuel cell layer 102 includes a group of cells each comprising an anode 107, a cathode 108, and a (e.g., polymer ion) exchange membrane 109 interposed therebetween. The fuel cell layer 102 utilized in system 100 may be a planar fuel cell, for example, the fuel cell layer discussed in commonly owned U.S. patent application Ser. No. 11/047,560, entitled "ELECTROCHEMICAL CELLS HAVING CURRENT-CARRYING STRUCTURES UNDERLYING ELECTROCHEMICAL REACTION LAYERS," filed on 2 Feb. 2005, and published as U.S. Pat. App. Publication 2005/0250004 on 10 Nov. 2005, the disclosure of which is incorporated herein by reference in its entirety. In fuel cell system 100, the cathode 108 of each cell is supplied with an air containing oxygen as an oxidizing agent, and the anode 107 of each cell with a fuel, such as hydrogen. Air may be supplied from an oxidizing agent supply to an air supply port. A fuel, such as hydrogen, is supplied from cellular reservoir 104 to the anode 107 of fuel cell layer 102 via a regulator outlet of a pressure regulator 110. In one example, the pressure regulator 110 is integrally mounted into a wall of the cellular reservoir 104. Among other things, this integrated pressure regulator 110 may comprise one or more of a regulator body including a regulator cavity therein, a resilient member, a diaphragm, a regulator valve, or a seal member. The diaphragm effectively separates the regulator cavity into a first chamber housing the resilient member and a second chamber connecting a regulator inlet and a regulator outlet. The regulator valve includes a valve inlet connected to a valve outlet via an internal flow passageway. A portion of the regulator valve is coupled with the diaphragm such that the two components move in concert. The seal member may be disposed between an outer surface of the regulator valve and the regulator body in effect separating the second chamber into a primary pressure plenum and a secondary pressure plenum. The diaphragm and the regulator valve are movingly responsive to a pressure difference between a first chamber pressure and a second chamber pressure.

In operation, cellular reservoir 104 is filled with fuel by pressurizing refueling port 114. (The pressurization allows fuel to enter into reservoir 104.) In one example, pressure regulator 110 is used to reduce the pressure of fuel supplied to fuel cell 102 to an acceptable pressure level. Alternatively, reservoir 104 is in direct communication with the fuel cell layer 102. In another example, a valve positioned between the reservoir 104 and fuel cell layer 102 controls the flow of fuel to the fuel cell layer 102 and may have a defined pressure drop. In another example, both a valve and pressure regulator 110 are positioned between the reservoir 104 and fuel cell layer 102.

Power from fuel cell layer 102 can be utilized by current collecting circuit 106, which collects the power from fuel cell 102 and routes it out of system 100 or alternatively into a conditioning electronics section 112, such as discussed in Mclean et al., U.S. patent application Ser. No. 11/621,533, entitled "PORTABLE FUEL CELL SYSTEMS AND METHODS THEREFOR," filed on 9 Jan. 2007, and published as U.S. Pat. App. Publication 2007/0184330 on 9 Aug. 2007. The current collecting circuit 106 may be integrated into the fuel cell layer 102.

Additionally, cellular reservoir 104 may comprise a refueling port 114 of the type, for example, discussed in Zimmermann, U.S. patent application Ser. No. 11/621,542, entitled "REFUELING VALVE FOR A FUEL STORAGE SYSTEM AND METHOD THEREFOR," filed on 9 Jan. 2007, and now issued as U.S. Pat. No. 7,938,144, the disclosure of which is incorporated herein by reference in its entirety. In the example shown, refueling valve 114 is integrated with a lower wall 118 of reservoir 104.

Figure 2:
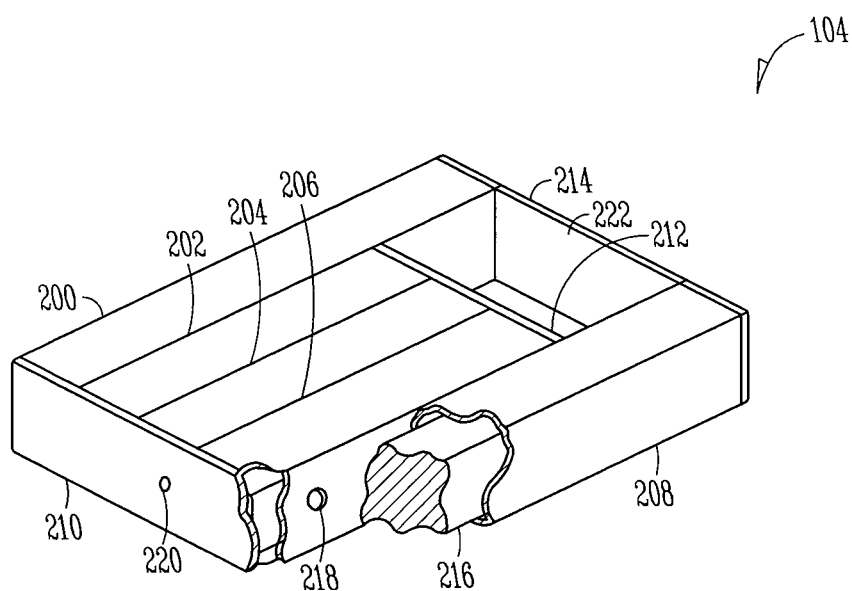
FIG. 2 illustrates an isometric view of a cellular reservoir and contents thereof, according to some embodiments of the invention.

FIG. 2 illustrates an isometric view of a cellular reservoir 104 structure and contents thereof, according to at least one embodiment of the invention. The cellular reservoir 104 may comprise an array of one or more cellular tubes 200-208. The tubes 200-208 are manufactured of strong, lightweight or low cost engineering materials. Examples of suitable materials include brass, aluminum, copper, steel, stainless steel, bronze, magnesium, titanium, nickel, fiberglass composites, carbon fiber composites, other composites generally, graphite, plastics, ceramics, glass or combinations thereof. In some situations, it is desirable to use a material with good thermal conductivity for the manufacture of the cellular tubes 200-208 which allows heat generated from the reaction of a fuel and a fuel storage material to be better managed (e.g., dissipated). In an example, the cellular tubes 200-208 can be coupled by any mechanical or chemical means, such as by soldering, welding, brazing, crimping or the use of thermal adhesives and the like. In one example, the cellular tubes 200-208 are ultrasonically welded to one another. Alternatively, the cellular tubes 200-208 are not physically or chemically bound together, so long as they are in fluid connection. In such a case, end caps 210-214 may hold the cellular tubes 200-208 in place, for example. In another example, the cellular tubes 200-208 can be extruded having one or more ports.

The cellular tubes 200-208 enclose a material 216, fuel or a combination thereof. The material may also comprise a fluid. In various examples, the fuel comprises a gas, such as hydrogen. Other examples of fuels include one or more of methane, propane, methanol, ethanol, formic acid, butane or ammonia. The material 216 may be a hydrogen storage material such as a metal hydride or chemical hydride. In some embodiments, the hydrogen storage material acts as a fuel storage material. Examples of chemical hydrides include, but are not limited to, sodium borohydride, potassium borohydride, other borohydride compounds, and alanates. Examples of metal hydrides include hydrides of $LaNi_5$, FeTi and $MmNi_5$, wherein Mm refers to a mixture of lanthanides. In one example, the metal hydride comprises a powder. In another example, the fuel storage material 216 is comprised of polymer enhanced metal hydride wafers, as discussed in commonly owned U.S. patent application Ser. No. 11/379,970, entitled "COMPOSITE HYDROGEN STORAGE MATERIAL AND METHOD RELATED THERETO," filed on 24 Apr. 2006, published on 26 Oct. 2006 as U.S. Pat. App. Publication 2006/0237688, and now issued as U.S. Pat. No. 7,708,815, the disclosure of which is incorporated herein by reference in its entirety. The hydrogen storage materials may store hydrogen by either physiosorption or chemiosorption, for example.

As mentioned above, in some examples the fuel storage material 216 is comprised of polymer enhanced metal hydride wafers. The wafers may be a composite hydrogen storage material made from a mixture of active material particles mixed with a binder, wherein the binder immobilizes the active material particles sufficient to maintain relative spatial relationships between the active material particles. The active material particles are capable of storing hydrogen or may occlude and desorb hydrogen. Examples of active material particles include metal hydrides or a metal, metal alloy, or metal compound capable of forming a metal hydride when in contact with hydrogen. The binder may be a thermoplastic binder and may be flexible enough to withstand the charging/discharging (hydriding/dehydriding) strain, while not melting or softening during the elevated temperatures of the charging phase. The active material particles may form a fine powder and can be formed by milling. The composite hydrogen storage material may be shaped as pellets, discs, spheres, wafers, rectangular wafers, or any porous or geometric shape.

Figure 8:
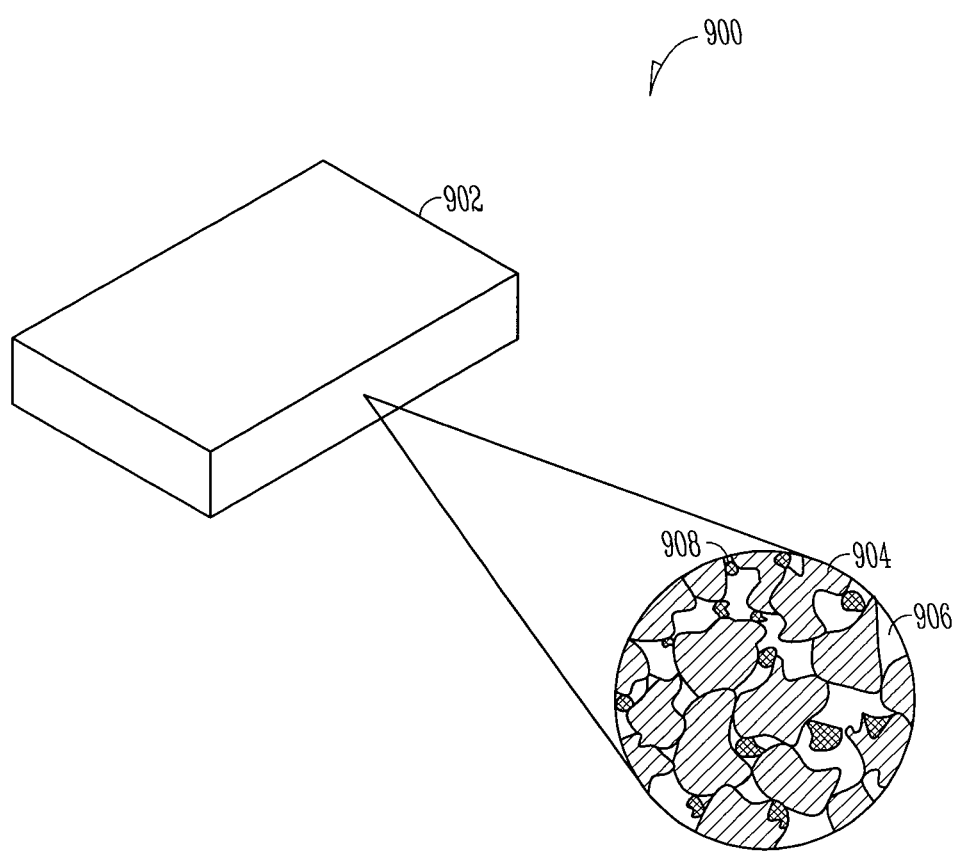
FIG. 8 illustrates a perspective view of a composite hydrogen storage material structure, according to some embodiments of the invention.

FIG. 8 illustrates a perspective view of a composite hydrogen storage material structure 900. A composite hydrogen storage material structure 900 can be formed in such shapes as a rectangular wafer 902, for example. The cross-sectional cut out illustrates the interaction of active material 904, such as a metal hydride, and binder 908, which may create one or more interstitial spaces or voids 906. The spaces 906 allow for hydrogen diffusion and flow through the active material, such as metal hydride particles so that hydrogen is able to reach the interior of the formed composite hydrogen storage material.

The cellular reservoir 104 includes one or more end caps. In one example, a first end cap 210 is in contact with the plurality of cellular tubes or cells 200-208, a second end cap 212 is in contact with the inner cellular tubes 202, 204, and 206, and a third end cap 214 is in contact with the outer cellular tubes 200 and 208. The end caps 210, 212, 214 can serve a number of functions. As one example, the end caps 210-214 serve as structural components that connect and seal the cellular tubes 200-208. As another example, the end caps 210, 212, 214 serve as a support for additional components such as one or more pressure regulators or loading valves. As yet another example, the end caps 210-214 provide one or more external ports 220 that allow for the refueling or discharge of the fuel in the cellular reservoir 104. In another example, the external ports are located on one or more of the cellular tubes 200-208. The number of external ports 220 is limited only so far as is necessary to maintain the structural integrity of the end caps 210-214 or cellular tubes 200-208. Optionally, the end caps 210-214 may be porous so that the pores represent one or more external ports 220.

By utilizing three end caps 210-214 in this configuration, a space 222 is created. This optional space 222 allows for the positioning of other system components, such as a delivery regulator, a fuel cell or power conditioning electronics, for example.

The cross-sectional cutaway of FIG. 2 displays one of the internal ports 218. The internal ports 218 provide a fluid connection between the cellular tubes 200-208. The fluid connection can be defined as a means by which a fluid, such as a liquid or gas, can pass from one component to the next. The internal ports 218 can be located on any internal wall of the tubes that are in contact with another cellular tube 200-208 or end cap 210-214, such that the internal ports 218 are positioned to provide fluid communication. Alternatively, the internal ports 218 are positioned in the end caps 210-214 through vias, such that the end caps also provide internal fluid connectivity. The internal ports 218 allow for fuel to freely flow throughout the plurality of cellular tubes 200-208. The internal ports 218 may be positioned in any plane relative to the cellular tubes 200-208, so long as the point of contact is adjacent to another cellular tube 200-208 or end cap 210-214. The diameter or number of the internal ports 218 may vary. Some considerations when choosing the diameter or number of the internal ports 218 include maintaining the strength of the inner walls of the cellular tubes 200-208 and reducing or, at least, minimizing any unequal distribution of internal pressure within the cellular reservoir 104.

The use of cellular tubes 200-208 in reservoir 104 allows for mechanical stress to be distributed so that the reservoir 104 can withstand large internal stress without deformation. In addition, the shared internal walls of cellular tubes 200-208 prevent unwanted movement of fuel storage materials. The internal walls of cellular tubes 200-208 also allow for improved heat transfer. Alternatively, or in addition, tension bearing members can be inserted in the reservoir 104 to supplement the ability of the internal walls of the cellular tubes 200-208 to relieve mechanical stress.

Figure 3:
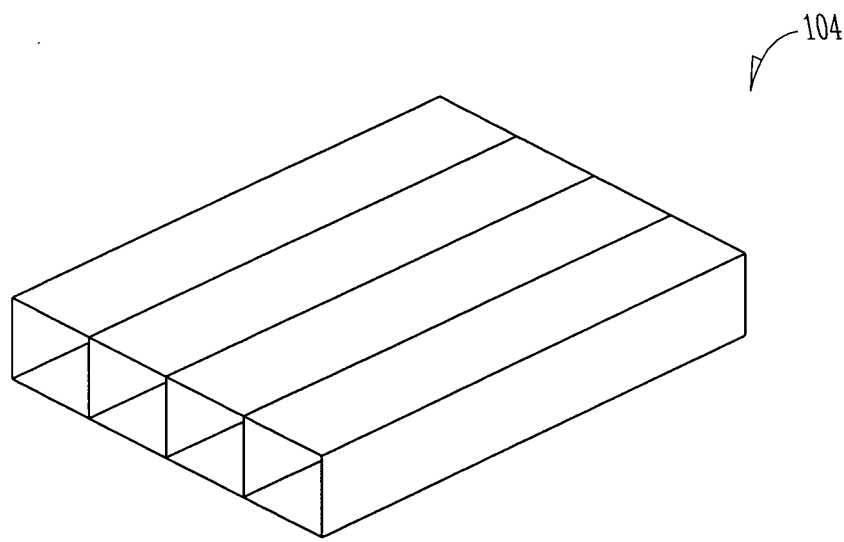
FIG. 3 illustrates an isometric view of a longitudinally parallel cellular reservoir configuration, according to some embodiments of the invention.
Figure 4:
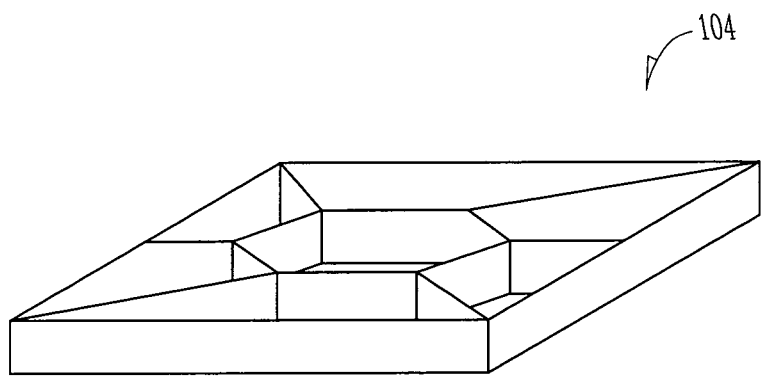
FIG. 4 illustrates an isometric view of a cellular reservoir honeycomb-type configuration, according to some embodiments of the invention.
Figure 5:
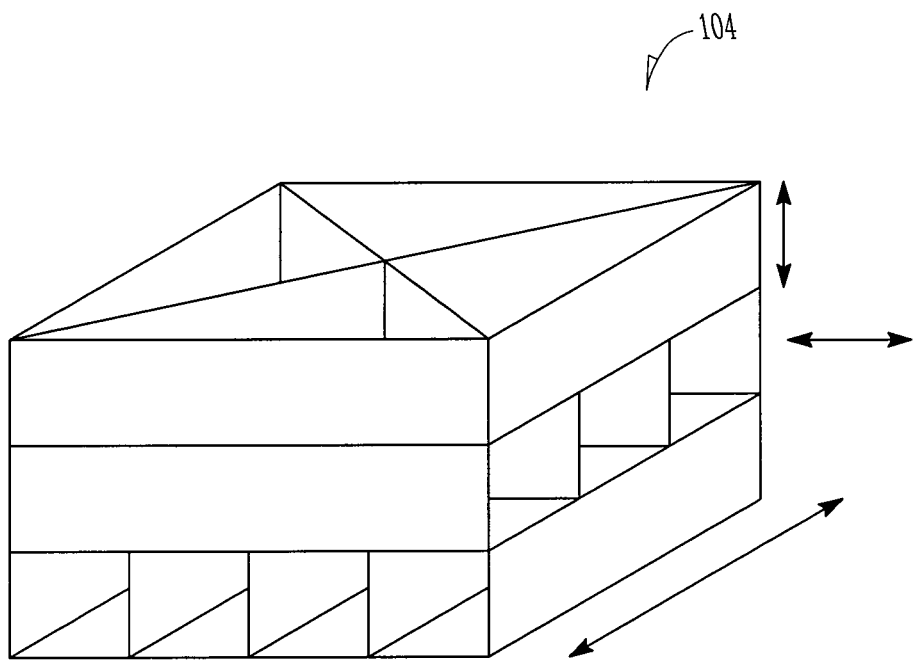
FIG. 5 illustrates an isometric view of a cellular reservoir configuration utilizing cells in multiple directions, according to some embodiments of the invention.

A cellular reservoir 104 may be shaped in any number of configurations in order to maximize the utilization of an available space for fuel storage. Although FIG. 2 illustrates a rectangular cellular reservoir with rectangular cellular tubes, the reservoir 104 configuration is not so limited. In other examples, the cellular tubes include a shape resembling a circle, ellipse, square, rectangle, triangle, hexagon or any other polygon or assembly of polygons that fit together geometrically, such that the internal walls of the cellular tubes are shared. The internal walls may be planar or non-planar. The shape of the internal cross-section of the cellular tubes may have a different shape as the external cross-section, for example. The internal walls may be circular within rectangular outer walls, for example. The length or width of the cellular tubes can be equal or unequal in size and dimension. The cellular tube cross-sections within a cellular reservoir 104 may be homogeneous or may vary throughout the reservoir to improve reservoir attributes, such as conformability or strength. In one example, the reservoir 104 comprises cells longitudinally parallel to one another, as shown in FIG. 3. In another embodiment, the reservoir 104 comprises shorter cells making up a honeycomb-type configuration, as illustrated in FIG. 4. A reservoir 104 can also comprise cells positioned in multiple directions as shown in FIG. 5, for example.

Figure 6:
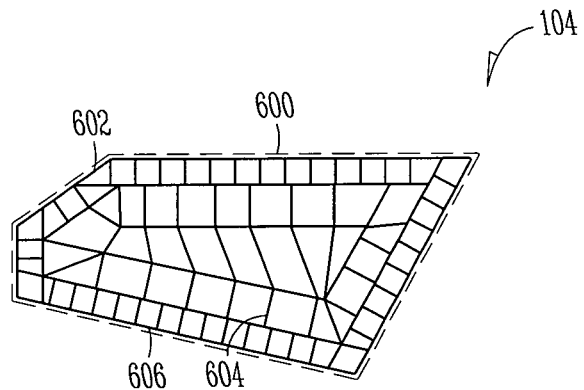
FIG. 6 illustrates a cross-sectional view of an irregularly shaped cellular reservoir, according to some embodiments of the invention.

FIG. 6 illustrates a cross-sectional view of an irregularly shaped cellular reservoir, according to at least one embodiment of the invention. The cellular reservoir perimeter 600 may define an irregular shape that a cellular reservoir 104 can use to most utilize a space, such as in a portable device. Among other places, larger cells 604 may be utilized in the center of a geometrical shape where less strength, rigidity and heat conduction is often needed. Smaller cells 606 may be positioned near the perimeter 600 where a higher strength, rigidity and heat conduction is often required. Irregularly-shaped cells 602 are shown near the perimeter 600 where particular reservoir geometries can be accommodated. Irregularly-shaped cells 602 are shaped in any geometric form such that they allow for the reservoir 104 to maximize the space allotted in a device.

Figure 7:
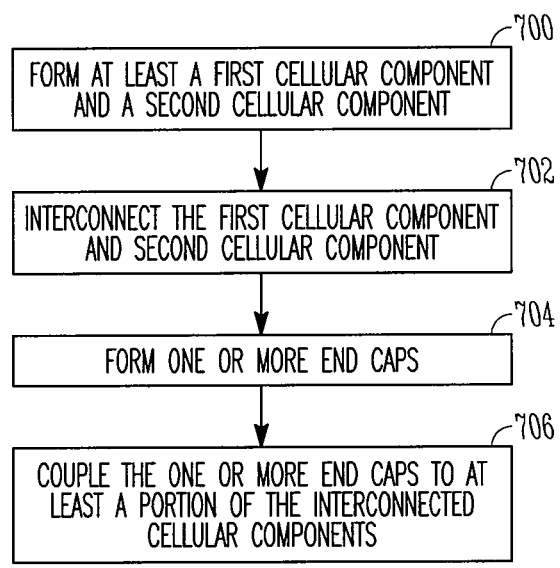
FIG. 7 illustrates a block flow diagram of a method of fabricating a cellular reservoir, according to some embodiments of the invention.

FIG. 7 illustrates a block flow diagram of a method of fabricating a cellular reservoir, according to at least one embodiment of the invention. At least a first cellular component and a second cellular component are formed 700. The cellular components may be uniform in size and shape or be irregularly shaped to conform to a specific space. Each component may define one or more cellular compartments. The cellular components enclose a fuel, a fuel storage material or a combination thereof. The first and second cellular components are next interconnected 702. One or more internal ports are formed, such that the connected cellular components are in fluid connection. The cellular components may be physically or chemically bound, such as by way of soldering, welding, brazing, crimping or the use of thermal adhesives. Optionally, the first and second cellular components are in fluid connection only and are not physically or chemically bound. The cellular components may be formed and connected in a single step by molding or casting, for example. One or more end caps are formed 704. The end caps may include one or more external ports, for adding or removing fuel from the cellular components. The one or more end caps are coupled to at least a portion of the interconnected cellular components 706. The internal ports may be one or more holes in the commonly shared inner walls of the cellular components or as vias in the one or more end caps. The one or more external ports may also be formed in one or more of the cellular components, for example.

Although a majority of this patent document discusses cellular reservoirs in association with fuel cell systems, the present assemblies, devices and methods are not so limited. Rather, the present assemblies, devices and methods further extend to use with other electrochemical systems, such as batteries or larger scale fuel cells, where it is desirable to maximize fuel storage space while maintaining the physical integrity of the reservoir. In addition, embodiments of the present invention are applicable to compressed gas reservoirs used in a variety of industries, hydride storage reservoirs, air conditioners, hydrogen compressors and heat pumps, for example. It will further be appreciated by those skilled in the art that while a number of specific dimensions or method orders are discussed above and/or recited herein, the present assemblies and devices can be made of any size (e.g., length, widths, shapes, or diameters) and may be fabricated in method orders other than those discussed.

It is to be understood that the above description is intended to be illustrative, and not restrictive. For example, the above-described embodiments (and/or aspects thereof) may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, various features may be grouped together to streamline the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, with each claim standing on its own as a separate embodiment.

What is claimed is:

1. A reservoir assembly comprising:
   a first cellular component interconnected with at least a second cellular component, the interconnected cellular components arranged together to substantially fill an available device space in a device;
   one or more end caps coupled to a portion of the first or the second cellular components;
   one or more internal ports, each internal port fluidly connecting the first interconnected cellular component to at least the second interconnected cellular component;
   one or more external ports for adding or removing a fluid from the reservoir, wherein the one or more external ports are positioned in one or more of the cellular components or end caps; and
   a fuel storage material disposed within one or both of the first cellular component or the second cellular component;
   wherein the fuel storage material comprises a composite hydrogen storage material that includes metal hydride particles mixed with a binder; and wherein the reservoir assembly is coupled with the device; and wherein the device includes at least one fuel cell that includes an anode, a cathode, and an ion-exchange membrane; and wherein the reservoir assembly is configured to supply a fuel to the anode, and further including a pressure regulator configured to regulate a pressure of the fuel supplied to the anode, wherein the pressure regulator is integrally mounted into a wall of the reservoir assembly.

2. The reservoir assembly as recited in claim 1, wherein an internal structure of the interconnected cellular components is adapted to provide a strength and a rigidity to withstand an internal reservoir pressure.

3. The reservoir assembly as recited in claim 1, wherein an assembly wall comprises a wall of at least the first cellular component and the second cellular component.

4. The reservoir assembly as recited in claim 1, wherein a cross-sectional shape of the first cellular component or the second cellular component resembles a square, a rectangle, a triangle, or any other polygon that mates with a shape of an adjacent cellular component.

5. The reservoir assembly as recited in claim 4, wherein the cross-sectional shape of the first cellular component is substantially similar to the cross-sectional shape of the second cellular component.

6. The reservoir assembly as recited in claim 4, wherein the cross-sectional shape of the first cellular component differs from the cross-sectional shape of the second cellular component.

7. The reservoir assembly as recited in claim 1, wherein one or both of the first cellular component or the second cellular component comprise a thermally conductive material.

8. The reservoir assembly as recited in claim 7, wherein the thermally conductive material comprises one or more of copper, aluminum, or brass.

9. The reservoir assembly as recited in claim 1, wherein an interconnection between the first cellular component and at least the second cellular component comprises a weld, a solder, a braze, a crimp, or the use of a thermal adhesive.

10. The reservoir assembly as recited in claim 1, wherein an arrangement of the interconnected cellular components comprises an open space for housing one or more of a fuel cell, a delivery regulator, or power conditioning electronics.

11. The reservoir assembly as recited in claim 1, further comprising the fuel disposed within the first cellular component or the second cellular component.

12. The reservoir assembly as recited in claim 11, wherein the fuel comprises hydrogen.

13. The reservoir assembly as recited in claim 1 wherein the composite hydrogen storage material includes a metal hydride selected from the group consisting of: $LaNi_5$, FeTi and $MmNi_5$ hydrides, wherein Mm refers to a mixture of lanthanides.

14. The reservoir assembly of claim 1, wherein an internal cross-sectional shape of the first cellular component or the second cellular component resembles a circle or an ellipse.

15. The reservoir assembly of claim 1, wherein a cross-sectional shape of the reservoir assembly resembles a rectangle.

16. The reservoir assembly of claim 1, wherein the composite hydrogen storage material includes a polymer enhanced metal hydride wafer.

17. The reservoir assembly of claim 1, wherein the binder includes a thermoplastic binder.

18. A reservoir assembly comprising:
a first cellular component interconnected with at least a second cellular component, the interconnected cellular components arranged together to substantially fill an available device space in a device;
one or more end caps coupled to a portion of the first or the second cellular components;
one or more internal ports, each internal port fluidly connecting the first interconnected cellular component to at least the second interconnected cellular component;
one or more external ports for adding or removing a fluid from the reservoir, wherein the one or more external ports are positioned in one or more of the cellular components or end caps;
a fuel storage material disposed within one or both of the first cellular component or the second cellular component;
a refueling valve comprising a fuel inlet port;
at least one compressible member disposed adjacent to the fuel inlet port, the at least one compressible member having a first sealing position and a second fueling position, the at least one compressible member more compressed in the second fueling position than the first sealing position; the at least one compressible member sealingly coupled with the fuel inlet port when the at least one compressible member is in the first sealing position;
a fuel diffusion member disposed adjacent to the at least one compressible member; and
a fuel reservoir in fluid communication with the fuel inlet port when the at least one compressible member is disposed in the second fueling position;
wherein the fuel storage material comprises a composite hydrogen storage material that includes metal hydride particles mixed with a binder; and wherein the reservoir assembly is coupled with the device; and wherein the device includes at least one fuel cell that includes an anode, a cathode, and an ion-exchange membrane; and wherein the reservoir assembly is configured to supply a fuel to the anode.

19. The reservoir assembly as recited in claim 18, further comprising the fuel disposed within the plurality of interconnected cellular components.

20. The reservoir assembly as recited in claim 18, wherein the assembly is configured for use in combination with a hydride storage system, hydrogen compressor system, air conditioner system, heat pump system, or combinations thereof.

21. The reservoir assembly of claim 18, wherein an external cross-sectional shape of the first cellular component or the second cellular component resembles a square, a rectangle, a triangle, or any other polygon that mates with a shape of an adjacent cellular component.

22. The reservoir assembly of claim 18, wherein a cross-sectional shape of the reservoir assembly resembles a rectangle, and wherein an internal cross-sectional shape of at least one of the first or second cellular components resembles a circle or an eclipse.

23. The reservoir assembly of claim 18, wherein the composite hydrogen storage material includes a polymer enhanced metal hydride wafer.

24. The reservoir assembly of claim 18, wherein the binder includes a thermoplastic binder.

25. The reservoir assembly of claim 1, wherein the first and second cellular components define an internal cross-sectional shape and an outer cross-sectional shape and wherein the internal cross-sectional shape is different than the outer cross-sectional shape.

26. The reservoir assembly of claim 25, wherein the internal cross-sectional shape is circular and the outer cross-sectional shape is rectangular.

27. The reservoir assembly of claim 1, wherein the fuel storage material is a composite hydrogen storage material, and wherein the metal hydride particles are capable of occluding and desorbing hydrogen and the binder is a thermoplastic binder; wherein the binder elastically immobilizes the active material particles sufficient to maintain relative spatial relationships between the active material particles before, during and after any occluding and desorbing of hydrogen; and wherein the composite hydrogen storage material is capable of withstanding a force produced by a particle strain during occlusion and desorption of hydrogen by the active material particles, sufficient to provide a load bearing member independently or within a storage vessel.

* * * * *